United States Patent [19]
Cohen et al.

[11] 3,883,353
[45] May 13, 1975

[54] SPLICING OPTICAL FIBERS

[75] Inventors: Leonard George Cohen, Matawan; John Stone Cook, Summit; Martin Victor Schneider, Holmdel, all of N.J.

[73] Assignee: Bell Telephone Laboratories, Incorporated, Murray Hill, N.J.

[22] Filed: May 29, 1973

[21] Appl. No.: 364,500

[52] U.S. Cl. .......... 96/38.3; 96/36; 156/8; 156/15
[51] Int. Cl. .......... G03c 5/00; G03c 11/00
[58] Field of Search .......... 96/38.3, 36, 35.1; 156/8, 156/15

[56] References Cited
UNITED STATES PATENTS

| | | | |
|---|---|---|---|
| 3,658,528 | 4/1972 | Berman et al. | 96/38.3 |
| 3,771,983 | 11/1973 | Straka | 96/38.3 |

*Primary Examiner*—Norman G. Torchin
*Assistant Examiner*—Edward C. Kimlin
*Attorney, Agent, or Firm*—L. C. Canepa

[57] ABSTRACT

Photolithographic techniques are employed to shape the ends of two cladded-core optical fibers that are to be spliced together. An easily aligned high-efficiency male-to-female connection is made by forming a protruding-core portion on one end and a mating indented-core portion on the other end.

6 Claims, 6 Drawing Figures

SPLICING OPTICAL FIBERS

BACKGROUND OF THE INVENTION

This invention relates to photolithographic techniques and, more particularly, to the use of such techniques for splicing together cladded-core optical fibers.

In a number of applications of practical interest it is important to be able to splice together optical fiber ends in a manner that achieves a high-efficiency light coupling therebetween. The handling and aligning of very-small-diameter fibers to achieve this desired result involve vexing problems. To solve these problems, active work is underway in the optical fiber art to devise improved splicing techniques.

SUMMARY OF THE INVENTION

An object of the present invention is a new method for splicing together optical fiber ends.

More specifically, an object of this invention is a photolithographic technique for shaping the ends of cladded-core optical fibers that are to be joined together.

Briefly, these and other objects of the present invention are realized in a specific illustrative method in which a first cladded-core optical fiber is processed to form a protruding-core portion on one end thereof. The end of a second cladded-core fiber to be spliced to the one end of the first fiber is processed to form a mated indented-core portion. The processed ends are then joined together to form a high-efficiency male-to-female connection.

BRIEF DESCRIPTION OF THE DRAWING

A complete understanding of the present invention and of the above and other objects thereof may be gained from a consideration of the following described process presented hereinbelow in connection with the accompanying drawing, in which.

DETAILED DESCRIPTION

Figure 1:
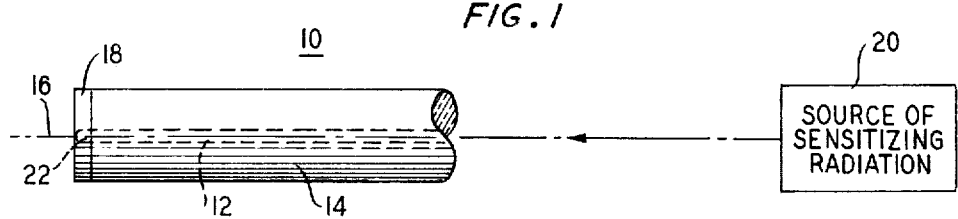
FIG. 1 illustrates the manner in which selected portions of a photoresist material coated on a fiber end are exposed to sensitizing radiation.

FIG. 1 shows a conventional cladded-core optical fiber 10 made, for example, of quartz. Illustratively, the fiber, which is circular in cross section, includes a 4-$\mu$m-diameter core 12 and a 250-$\mu$m-diameter cladding 14.

Illustratively, the cladding 14 of the fiber shown in FIG. 1 is made of quartz (fused silica) and the core 12 thereof is made of suitably doped fused silica. As is well known in the art, the core of such a fiber exhibits a slightly higher index of refraction than that of the cladding. An illustrative fiber of this type, wherein the dopant is a multivalent metal oxide, is described in R. D. Maurer et al. U.S. Pat. No. 3,659,915, issued May 2, 1972. It is to be emphasized, however, that a variety of other known and conventional glass materials systems are suitable for forming a fiber to be used in carrying out the processes of the present invention. Other such suitable materials are described, for example, in "Low-Loss Glass Fibers for Optical Transmission" by A. D. Pearson and W. G. French, *Bell Laboratories Record*, April 1972, pp. 103–109.

The first step involved in processing the left-hand end of the fiber 10 to form a male- or female-type connector made in accordance with the principles of the present invention is to prepare the end so that it is flat and lies in a plane that is approximately perpendicular to the main longitudinal axis 16 of the fiber. This may be accomplished, for example, simply by clamping the fiber in a jig, scoring the surface thereof with a diamond blade and then applying a longitudinal force to separate the fiber at the score. In practice, this simple procedure is usually adequate to prepare the fiber end in a satisfactory manner without any further processing. If, however, deviations from flatness or from perpendicularity are observed, these can easily be corrected by grinding the end.

A newly cut face on an optical fiber usually does not need cleaning. If, however, cleaning of the face is required, suitable materials therefor are trichlorethylene, xylene or photoresist strippers, which are conventional cleaning agents.

Subsequently, the entire left-hand end (both core and cladding) of the fiber shown in FIG. 1 is coated with a layer 18 of a light-sensitive material. This is done by dipping the end into the material, by spraying, or otherwise depositing the material onto the end in any manner known in the art. In any case, a layer of the material several micrometers thick is applied to the left-hand face of the fiber 10.

In accordance with the principles of the present invention, the light-sensitive material applied to a fiber end may be either a photosensitive polymer designated a negative photoresist or a photosensitive polymer designated a positive photoresist. It is characteristic of a negative photoresist that portions thereof exposed to sensitizing radiation remain in place on the fiber end during subsequent developing and rinsing operations whereas unexposed portions are washed off the end during those operations. On the other hand, it is characteristic of a positive photoresist that portions thereof exposed to sensitizing radiation do not remain in place on the fiber end during such subsequent operations whereas unexposed portions do remain there on.

A variety of negative and positive photoresist suitable for inclusion in the process described herein are known in the art. An illustrative photoresist of the so-called negative type is Micronegative Resist made by Eastman Kodak Company, Rochester, New York. An illustrative photoresist of the positive type is Azoplate (AZ-1350) Positive Working Photoresist made by Shipley Company Inc., Newton, Massachusetts.

The material deposited on the end of the fiber may comprise any one of a variety of known photoresists. Various negative photoresists comprising, for example, monomeric and cross-linkable polymeric compounds and elements are well known. Illustratively, addition polymers of the type described in U.S. Pat. Nos. 3,418,295 and 3,469,982, issued Dec. 24, 1968 and Sept. 30, 1969, respectively, are suitable for use as negative photoresists. Another example of a standard such negative photoresist suitable for utilization in the process described herein is cyclized-cis-polyisoprene combined with a diazide compound such as 2, 6-bis (p-azidobenzal)-4-methylcyclo hexanone and a solvent. Still other standard negative photoresists known in the art and suitable for use in the process described herein are disclosed in U.S. Pat. Nos. 3,520,683, 3,623,870 and 3,674,492, issued July 14, 1970, Nov. 30, 1971 and July 4, 1972, respectively, and in Chapter 7 of *Handbook of Thin Film Technology*, edited by L. I. Maissel and R. Glang, McGraw-Hill, 1970. In addition, a variety of positive photoresists suitable for use in the process described herein are also well known. An example of a standard such positive photoresist is a conventional cresolformaldehyde resin combined with photodecomposable naphthoquinone diazides and a solvent. Still other standard positive photoresists known in the art and suitable for use in the process described herein are disclosed in the aforecited *Handbook of Thin Film Technology*.

Exposure to ultraviolet light causes the exposed portions of the aforementioned illustrative negative photoresists to form a crosslinked molecular structure that is resistant to the subsequent steps employed to remove the unexposed material. This is the basis for forming a male-type connector end. On the other hand, exposure to ultraviolet light causes the exposed portion of the aforementioned illustrative positive photoresists to form a molecular structure that is not resistant to the subsequent processing steps. In this way a female-type connector is formed.

An advantageous way of exposing selected portions of the light-sensitive layer 18 to sensitizing radiation is illustrated in FIG. 1. A source 20 which comprises, for example, a mercury arc lamp is positioned to direct its ultraviolet output along the core 12 to impinge on the right-hand or rear surface of the layer 18.

Consider first the fabrication of a male-type connector on the left-hand end of the fiber 10 shown in FIG. 1. In that case, as indicated above, the layer 18 comprises a negative photoresist material and the output of the source 20 (at a wavelength of, for example, 3,000–5,000 Angstroms) is effective to cause crosslinking of the molecules of the layer 18 in the immediate vicinity of the core 12.

In an arrangement of the type shown in FIG. 1 some of the incident ultraviolet radiation may penetrate into the cladding 14 during transit from right to left. To minimize the amount of such penetrating radiation that reaches the left-hand end of the fiber 10, an index-matching material such as glycerine may be coated on a portion of the outer surface of the fiber. As a result of such a coating, penetrating radiation will be scattered out of the fiber by the coating into the medium surrounding the fiber. Accordingly, the ultraviolet radiation that actually reaches the left-hand end of the fiber 10 is automatically confined to the core area and the immediate vicinity thereof.

The dimensions of the exposed portion of the layer 18 of FIG. 1 are a function of the product of the intensity of the sensitizing ultraviolet radiation and of the exposure time. For a light intensity of approximately 0.3mW/cm$^2$ a 4-6-$\mu$m-wide by 2-3-$\mu$m-thick exposed section is obtained for an exposure time of about 3 minutes. In that case the ultraviolet light supplied by the source 20 is confined in its effect almost entirely to depicted region 22 of the layer 18. The region 22 directly overlies and is only slightly larger in area than the area of the core 12.

Figure 2:
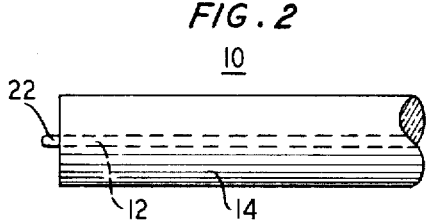
FIGS. 2 and 3 represent the results of various steps followed to form a male-type connector on a fiber end.

After exposure of the layer 18, as depicted above, the fiber end including the layer 18 is dipped in a micronegative developer (for example, in Kodak Micronegative Resist Developer made by Eastman Kodak Company) for about 20 seconds. This is followed by a micronegative rinse (in, for example, Kodak Micronegative Resist Rinse made by Eastman Kodak Company) for approximately 20 seconds. At that point all of the layer 18, except the exposed and developed region 22, has been removed from the left-hand end of the fiber 10, as shown in FIG. 2. As indicated above, the region 22 measures, for example, about 4-6$\mu$m in diameter and is approximately 2-3$\mu$m thick.

In accordance with the principles of the present invention, a suitable etchant, for example hydrofluoric acid, is then applied to the left-hand fiber end illustrated in FIG. 2. The photoresist region 22 serves as a temporary mask to protect the core 12 from being attacked by the etchant. The etchant does, however, attack the unprotected cladding portion of the left-hand face of the fiber 10. As a result a longitudinal portion of the cladding is removed from the fiber.

After a predetermined etching period, illustratively several minutes long, the mask region 22 is also removed by the aforementioned etchant. The etching step is terminated (for example, by washing the fiber end in distilled water and photoresist stripper to remove any remnants of photoresist) at the point at which the region 22 has just been removed. The appearance of the fiber end is then as depicted in FIG. 3.

One way of carrying out the etching step described above is to immerse the left-hand fiber end shown in FIG. 2 in an etchant bath. Advantageously, to insure even and uniform etching the fiber is rotated in the bath during the etching process.

If etching is carried out by immersion in an etchant bath, the immersed outer surface of the cladding 14 (FIG. 2) adjacent to the left-hand end of the fiber 10 is also attacked by the etchant. In some cases this is tolerable. If it is not, a suitable etch resist (for example, Apiezon W Wax sold by James G. Biddle Company, Plymouth Meeting, Pennsylvania) is applied to the outer surface of that portion of the cladding to be immersed.

Figure 3:
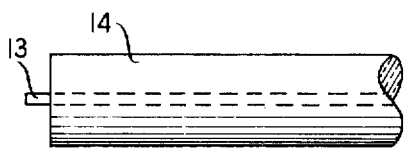

The protruding core portion 13 shown in FIG. 3 may, if desired, be made longer by coating the protrusion and the left-hand face of the cladding with the aforementioned photoresist and repeating the processing steps described above.

FIG. 1 is also representative of the initial steps to be followed in forming a female-type connector on the end of an optical fiber. But in that case, as specified above, the layer 18 is a photoresist material of the positive type. Accordingly, after exposure to sensitizing radiation, the region 22 of the photoresist layer is selectively removed during the aforementioned developing and rinsing steps.

Figure 4:
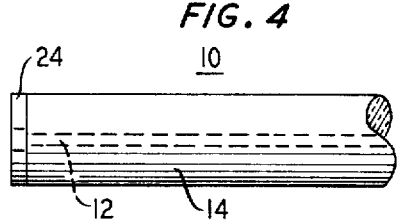
FIGS. 4 and 5 show the results of various steps followed to form a female-type connector.

At that point in the female-connector fabrication process the fiber end appears as shown in FIG. 4. The portion of the layer 18 that remains on the left-hand end of the fiber 10 is designated 24. This portion constitutes an annular region that covers the left-hand face of the cladding 14 but does not cover the left-hand end of the core 12. Hence, during a subsequent etching step, a longitudinal portion of the core 12 is attacked and removed, whereas the left-hand face of the cladding 14 is temporarily protected by the region 24 from attack by the etchant. Etching is terminated just after the region 24 is itself removed by the etchant.

Figure 5:
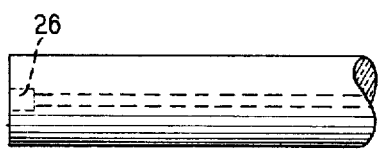

The result of the aforementioned steps is to form a female-type connector that includes an indented coreless portion 26, as shown in FIG. 5.

Figure 6:
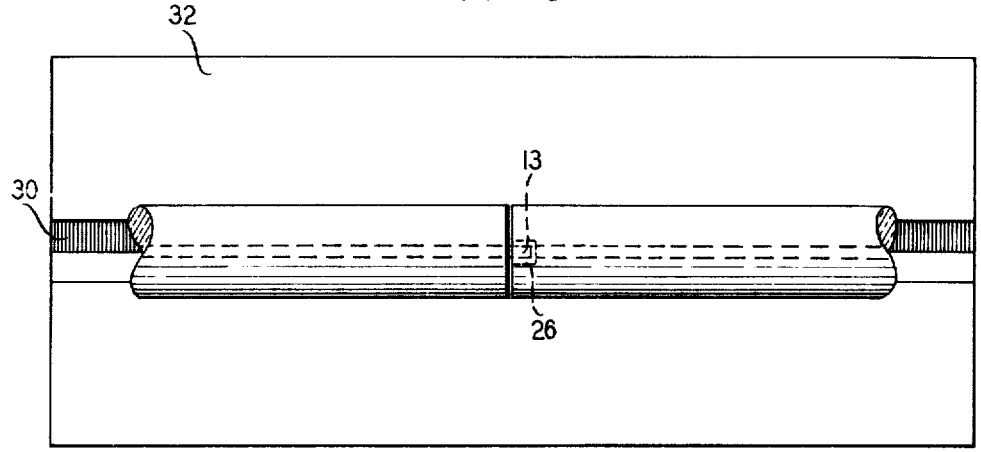
FIG. 6 depicts 2 fiber ends formed in accordance with the principles of the present invention butted together on a base plate member.

The male and female fiber ends illustrated in FIGS. 3 and 5, respectively, are then brought together. This is done, for example, by sliding the ends toward each other in a V-shaped groove 30 formed in a base plate member 32 (see FIG. 6). The protrusion 13 is inserted into the mating indented portion 26. The mated ends are permanently secured together by applying a drop of a suitable adhesive (for example, epoxy) to the joint between the fiber ends. In this way a permanent efficient coupling between the ends is achieved.

A variety of developers and rinses suitable for use in carrying out the processes described herein is known in the art. Illustrative such materials are specified, for example, in the aforecited U.S. Pat. Nos. 3,520,683 and 3,674,492 and in the aforecited *Handbook of Thin Film Technology*.

It is to be understood that the above-described method is only illustrative of the application of the principles of the present invention. In accordance with these principles, numerous other techniques may be devised by those skilled in the art without departing from the spirit and scope of the invention. For example, although emphasis herein has been directed to splicing together single-core fibers, it is to be understood that the aforedescribed method is also applicable to the simultaneous formation of protrusions and mating indentations on the respective ends of a plurality of fibers included in two cladded multicore optical fiber bundles that are to be joined together. Also, the aforedescribed etching steps may be carried out by directing an ion beam onto the surface of a fiber end whose core (male connector) or cladding (female connector) is masked by a layer of photoresist. Ion beam milling of the unmasked portions of the end surfaces is thereby achieved.

What is claimed is:

1. A method for shaping the ends of first and second optical fibers that are to be spliced together, each of said fibers comprising a relatively high index-of-refraction cylindrical core having a relatively low index-of-refraction cladding disposed thereabout, said method comprising the steps of:

coating the entire end surfaces of said first and second fibers with negative and positive radiation-sensitive material, respectively, exposing to radiation only a selected portion of the material coated on each of said end surfaces by directing at said material a radiant beam whose cross-sectional area approximates that of said core and is much less than the cross-sectional area of said core and cladding, said selected portion including the material covering the entire core area of each fiber end and excluding the major portion of the material that covers the cladding area of each fiber end, removing the unexposed portion of said material from said first fiber end and the exposed portion of said material from said second fiber end, and removing a longitudinal portion of each fiber end that is not protected by remaining material.

2. A method as in claim 1 wherein said exposing step comprises directing sensitizing radiation along the core of each of said fibers to impinge on the rear surfaces of the radiation-sensitive material coated on the ends thereof.

3. A method as in claim 2 wherein said removing step comprises applying hydrofluoric acid to each fiber end to remove a longitudinal portion thereof.

4. A method as in claim 2 wherein said removing step comprises directing an ion beam at each fiber end to remove a longitudinal portion thereof.

5. A method for forming a male-type connector on one end of a length of optical fiber that comprises a relatively high index-of-refraction cylindrical core having a relatively low index-of-refraction cladding disposed thereabout, said method comprising the steps of:

coating said one end with a layer of radiation-sensitive material of the negative photoresist type, directing sensitizing radiation into the other end of said fiber to propagate along the core thereof and to impinge on the rear surface of said layer only in the immediate vicinity of said core thereby to expose a portion of said material directly overlying said core, removing the unexposed portion of said material from said one end, and removing a longitudinal portion of said one end that is not protected by said exposed portion of said material.

6. A method for forming a female-type connector on one end of a length of optical fiber that comprises a relatively high index-of-refraction cylindrical core having a relatively low index-of-refraction cladding disposed thereabout, said method comprising the steps of:

coating said one end with a layer of radiation-sensitive material of the positive photoresist type, directing sensitizing radiation onto the other end of said fiber to propagate along the core thereof and to impinge on the rear surface of said layer only in the immediate vicinity of said core thereby to expose a portion of said material directly overlying said core, removing the exposed portion of said material from said one end, and removing a longitudinal portion of said one end that is not protected by said unexposed portion of said material.

* * * * *